April 6, 1954   W. D. BRADSHAW   2,674,262
RATE OF FLOW VALVE
Filed March 30, 1951

William D. Bradshaw
Inventor
by Heard, Smith, Porter, + Chittick
Attorneys

Patented Apr. 6, 1954

2,674,262

UNITED STATES PATENT OFFICE 2,674,262

RATE OF FLOW VALVE

William D. Bradshaw, Newton, Mass.

Application March 30, 1951, Serial No. 218,347

8 Claims. (Cl. 137—517)

This invention relates to a rate of flow valve, and particularly to a valve sensitive to rate of flow for use in an automatic washing machine for shutting off the flow of water therein in the event of break-downs or failures in the machine, and thus to prevent excessive water leakage and consequent damages.

It is not at all uncommon in automatic washing machines for a part to fail or break down or a hose or hose connection give way, whether the machine is in operation or not, and thus permit tons of water to leak and escape into the house and to cause untold damage, before the accident is discovered and the water can be turned off. At present automatic washing machine manufacturers instruct and warn the housewife to shut off the water when the machine is not in operation. But very frequently these instructions are not carried out, and a failure or break down in the machine may occur at any time. Because of the many and great losses of this nature which have occurred, I have sought to design a valve which would automatically shut off the flow of water to the machine in the event of any failure of a part which would permit water to escape.

The valve which I have designed is sensitive to rate of flow and is simple in its construction and operation, and is inexpensive to make and install. It is automatic and positive in action and is designed to operate at any desired velocity or rate of flow. The valve will re-set itself after the undesirable condition has been corrected, and the pressure equalized. The constant flexing of the valve disk in operation also tends to keep the valve clear of scale and other deposits tending to clog its operation. The valve operates in response to an increased rate of flow of liquid, which may occur in a washing machine for instance, in the event of failure or break down of the part to close completely, and thus shut off the flow of water to the machine. While particularly designed for use in an automatic washing machine, it is obvious, of course, that my valve has many other uses and applications where similar performance is desired, such as in water mains, oil or for pipe lines and automatic sprinkler systems.

Briefly, my valve comprises a tubular pipe connection open at the top and interiorly threaded, to be connected at its open end to any suitable pipe or hose line carrying liquids, and having a bottom with a central orifice of reduced diameter therein. A second tubular pipe connection is preferably provided, separate from the first, having a horizontal circular flange at its top end and a tubular extension of reduced diameter. The second connection is inserted in the first, with its tubular extension extending through the central orifice in the bottom of the first connection, and with its flanged top seating against the bottom of the first connection. If desired the second pipe connection may, of course, be made integral with the first. The end of tubular extension preferably carries a series of enlarged circumferential ridges or corrugations to provide a tight fit with the rubber hose to which it is intended to be connected. A peripheral groove is preferably provided around the inside bottom edge of the first pipe connection, in which to seat a flexible valve member. The flexible valve member comprises a removable convex disk of any suitable flexible material such as rubber or plastic. The convex disk is preferably molded or set in convex shape, and has a series of small holes therein, preferably spaced inwardly from the peripheral edge of the disk, between the edge of the central orifice in the bottom of the first pipe connection. A peripheral vertical flange may be provided around the top of the disk, which may be integral with or separate from the disk. A series of radial ridges are preferably provided on the underside of the disk to prevent a sudden shut-off of the valve and thus prevent chattering through the pipe connection. The valve member being compressible will be pressed down to closed position by any flow of liquid above a predetermined amount which overcomes the force of the valve member holding it in convex or open position. When the flow of liquid falls below its predetermined rate of flow and pressure is equalized sufficiently the valve automatically snaps back to convex shape, thus opening the valve to normal flow of liquid therethrough.

Before explaining in detail the present invention it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention claimed herein beyond the requirements of the prior art.

Figure 1:
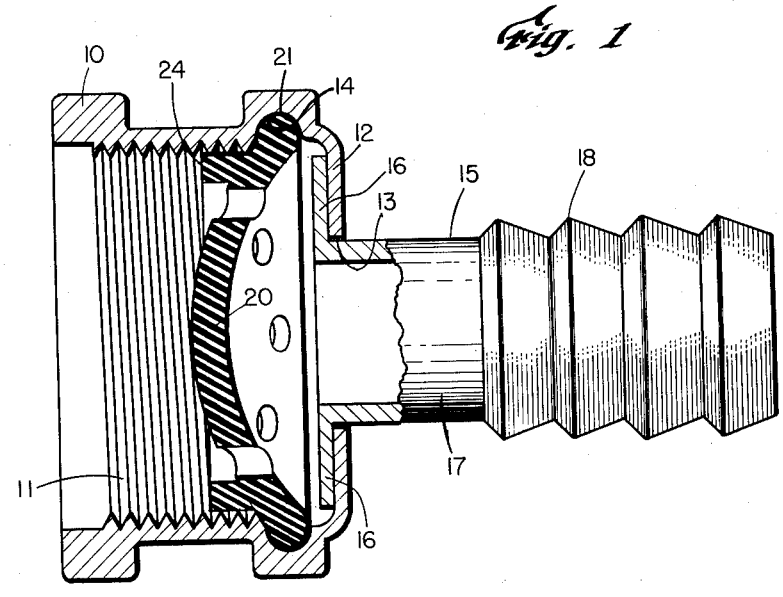
Fig. 1 is a vertical section through the pipe connection with a lower portion in front elevation.
Figure 2:
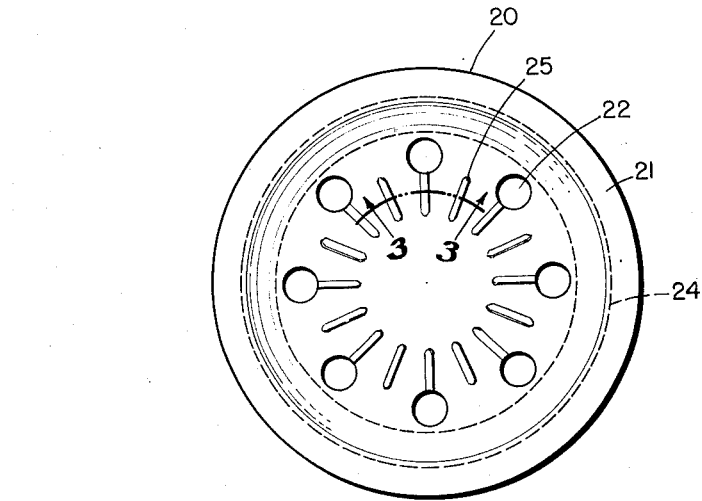
Fig. 2 is a plan view of the flexible valve member.
Figure 3:
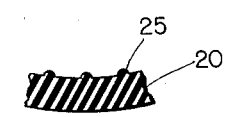
Fig. 3 is a vertical section on line 3—3 of Fig. 2.

In the drawings 10 represents the tubular pipe connection of any suitable material, preferably metal or plastic open at the top and interiorly threaded at 11 for connection into a pipe line hose or other conduit. Pipe connection 10 has a bottom 12, and a central orifice 13 of reduced diameter therein and preferably has a peripheral groove 14 formed around the inside and below the interior threads 11, and adjacent the bottom 12 of the connection. A second tubular pipe connection 15 is provided, preferably separate from the first connection, but may be cast integrally with the first connection. Separate connection 15 includes a horizontal circular flange 16 at its top end and a tubular member 17 extending therefrom. On its lower end connection 15 carries a series of enlarged circumferential ridges or corrugations 18 to provide a tight connection with a rubber hose in which connection 15 is intended to be inserted. The second connection 15 is inserted in the first connection 10, with its tubular member 17 extending through the central orifice 13 in the bottom 12 of the first connection 10, and its flanged top 16 seated against the bottom 12 of the first connection 10.

A flexible circular valve member 20 is provided, to be inserted in the first pipe connection 10 and carries a beaded edge 21 to be seated in the bottom groove 14 thereof. Valve member 20 comprises a removable convex disk of any suitable flexible material such as rubber and is preferably molded in convex shape. It will be understood, however, that it may be given a convex shape by making it of larger diameter than that of the groove 14 in which it is intended to be seated. Valve member 20 is provided with a series of small holes 22 preferably arranged in a circle and preferably spaced inwardly from the peripheral edge of the disk, between the edge thereof and the central orifice 13 in the bottom 12 of the pipe connection 10. The number and size of the holes is naturally dependent upon the flow of liquid desired to be passed through the valve member 20 and preferably may range from 9 to 15 in number. To make the valve member adjustable knock-out semi-detached plugs (not shown) may be left in alternate holes for instance. A vertical circular flange is provided preferably molded integrally with the disk 20, and may be made separate if desired, to assist in seating disk 20 in the bottom of pipe connection 10. A series of radial ridges 25 are also preferably provided on the underside of disk 20, extending from the line of holes 22 toward the center of the disk. Ridges 25 are provided to permit a slow leak of liquid beyond the holes 22 and through the central orifice 13 in the first connection 10 and through the tubular member 17 of the second connection 15. A quick closing of the valve member 20 is thus avoided, preventing surging and chattering in the pipe connections. It will be understood that flexible disk 20 is compressible, and when the flow of liquid through the holes 22 exceeds a predetermined amount, the pressure of the liquid will cause the disk 20 to flatten out, thereby shutting off the flow of liquid through the holes 20 to the central orifice 13 and the tubular connection 17. The convex valve member 20 is, of course, designed and constructed to compress and thus close the valve at any desired rate of flow. The proper relative resiliency and stiffness of the rubber valve member and the number and size of the holes 22, may be readily determined by tests, whereby the valve will operate to close at any predetermined rate of flow. As an illustration in use in an automatic washing machine, such machines are ordinarily built to receive a flow of water therethrough at the rate of six gallons per minute. Valve member 20 will thus be designed and constructed to close at a rate of flow of eight gallons per minute, for instance. Ordinary city or town water pressure usually ranges from 30 to 60 pounds per square inch pipe at the rate of 15 to 30 gallons per minute. It will be seen, therefore, that if there is a break-down or failure in the machine as from a hose or connection, whereby the normal rate of flow of water into the machine is suddenly increased above 8 gallons per minute, the valve member 20 will be compressed by the increased rate of flow of water through the pipe connection 10, which overcomes the inherent force or strength of the valve member 20 tending to hold it in its convex shape. On the release of pressure above 8 pounds on the valve member 20, or on the development of a back pressure, the valve member 20 will automatically snap back to its convex shape and thus open up the pipe connection to the flow of water again. Such back pressure may be provided for by permitting a drip leak through the valve member 20, as by leaving open the groove between a series of ridges 25 on the underside of the member 20, rather than closing off such ridges. Such a drip leak through the valve member 20 is, of course, not objectionable because it would normally dry up in the washing machine. When a tight seal is desired the ridges 25 can be omitted.

It will thus be seen that I have provided a rate of flow valve which will close in response to suddenly increased rate of flow of liquid therethrough, which is automatic in operation, simple, inexpensive and which will last indefinitely.

I claim:

1. A valve construction sensitive to rate of flow of a liquid, which comprises a tubular pipe connection having a tubular extension of reduced diameter leading therefrom and a removable valve member seated therein, said valve member comprising a disk of flexible material normally holding a convex shape and having a series of holes arranged in a circle and spaced inwardly from the peripheral edge of the disk between its edge and the edge of the tubular extension to allow flow of liquid therethrough at a predetermined rate, said valve member being compressible to seat against the top of the tubular extension in response to increased rate of flow of liquid above a predetermined amount.

2. A valve construction sensitive to rate of flow of a liquid, which comprises a tubular pipe connection having an upstanding flange a bottom and a tubular extension of reduced diameter leading therefrom, a removable valve member seated in the bottom of said connection, said valve member comprising a disk of flexible material normally holding a convex shape and having a series of holes arranged in a circle and spaced inwardly from the peripheral edge of the disk between its edge and the edge of the tubular extension to allow flow of liquid therethrough at a predetermined rate, said valve member being compressible to seat against the bottom of the tubular extension in response to increased rate of flow of liquid above a predetermined amount.

3. A valve construction sensitive to rate of flow of a liquid, which comprises a tubular pipe connection having an upstanding flange a bottom and a central orifice of reduced diameter therein, and a tubular extension leading from said central orifice, and a removable valve member seated therein, said valve member comprising a disk of flexible material normally holding a convex shape and having a series of holes arranged in a circle and spaced inwardly from the peripheral edge of the disk between its edge and the edge of the tubular extension to allow flow of liquid therethrough at a predetermined rate, said disk having an annular bead seating in the bottom of said tubular pipe connection said valve member being compressible to seat against the top of the tubular extension in response to increased rate of flow of liquid above a predetermined amount.

4. A valve construction sensitive to the rate of flow of a liquid, which comprises a tubular pipe connection and having a tubular extension of reduced diameter leading therefrom, a peripheral groove provided on the inside of said pipe connection at the bottom thereof, a removable valve member seated in said groove, said valve member comprising a disk of flexible material normally holding a convex shape and having a series of holes arranged in a circle and spaced inwardly from the peripheral edge of the disk between its edge and the edge of the tubular extension to allow flow of liquid therethrough at a predetermined rate, said disk having an annular bead seating in the peripheral groove of said pipe connection said valve member being compressible to seat against the top of the tubular extension in response to increased rate of flow of liquid above a predetermined amount.

5. A valve construction sensitive to rate of flow of a liquid, which comprises a tubular pipe connection having an upstanding flange a bottom and a tubular extension of reduced diameter leading therefrom, a peripheral groove provided on the inside of said pipe connection adjacent the bottom thereof, a removable valve member seated in said peripheral groove, said valve member comprising a disk of flexible material normally holding a convex shape and having a series of holes arranged in a circle and spaced inwardly from the peripheral edge of the disk between its edge and the edge of the tubular extension to allow flow of liquid therethrough at a predetermined rate, said disk having an annular bead seating in the peripheral groove of said pipe connection said valve member being compressible to seat against the top of the tubular extension in response to increased rate of flow of liquid above a predetermined amount.

6. A valve construction sensitive to rate of flow of a liquid, which comprises a tubular pipe connection having an upstanding flange a bottom and a central orifice of reduced diameter therein, a separate connection fitting in said first connection, having a flat circular flange at the top seated against the bottom of said first connection and having a tubular extension of reduced diameter extending through the central orifice of said first connection, a removable valve member seated in the bottom of said first connection, said valve member comprising a disk of flexible material normally holding a convex shape and having a series of holes arranged in a circle and spaced inwardly from the peripheral edge of the disk between its edge and the edge of the tubular extension of the second pipe connection, to allow flow of liquid therethrough at a predetermined rate, said disk having an annular bead seating in the bottom of said tubular pipe connection said valve member being compressible to seat against the flange of the separate connection fitting in response to increased rate of flow of liquid above a predetermined amount.

7. A valve construction sensitive to rate of flow of a liquid, which comprises a tubular pipe connection having an upstanding flange a bottom and a central orifice of reduced diameter therein and a peripheral groove on the inside of said connection adjacent the bottom thereof, a separate connection fitting in said first connection having a flat circular flange at the top seated against the bottom of said first connection and having a tubular extension of reduced diameter extending through the central orifice of said first connection, a removable valve member seated in the peripheral groove in said first connection, said valve member comprising a disk of flexible material normally holding a convex shape and having a series of holes arranged in a circle and spaced inwardly from the peripheral edge of the disk between its edge and the edge of the tubular extension of the second pipe connection, to allow flow of liquid therethrough at a predetermined rate, said valve member being compressible to seat against the flange of the separate connection fitting in response to increased rate of flow of liquid above a predetermined amount, said disk being provided with an annular bead on its top and outwardly of the holes adapted to seal against a mating conduit member when said tubular pipe connection is attached thereto.

8. A valve construction sensitive to rate of flow of a liquid, which comprises a tubular pipe connection having an upstanding flange, a bottom and a tubular extension of reduced diameter leading therefrom, a peripheral groove provided on the inside of said pipe connection adjacent the bottom thereof, a removable valve member seated in said peripheral groove, said valve member comprising a disk of flexible material normally holding a convex shape and having a series of holes arranged in a circle and spaced inwardly from the peripheral edge of the disk between its edge and the edge of the tubular extension to allow flow of liquid therethrough at a predetermined rate, and said disk having a series of radial ridges on its concave side adjacent said holes, said valve member being compressible to seat against the top of the tubular extension in response to increased rate of flow of liquid above a predetermined amount.

References Cited in the file of this patent

UNITED STATES PATENTS

| Number | Name | Date |
|---|---|---|
| 1,477,261 | Hart | Dec. 11, 1923 |
| 2,299,472 | Edmundson | Oct. 20, 1942 |
| 2,370,451 | Dank | Feb. 27, 1945 |
| 2,371,891 | Hoffman | Mar. 20, 1945 |

FOREIGN PATENTS

| Number | Country | Date |
|---|---|---|
| 448,784 | Germany | 1927 |